US008899505B2

(12) United States Patent
Sim (10) Patent No.: US 8,899,505 B2
(45) Date of Patent: Dec. 2, 2014

(54) BRUSH BRAKE DEVICE FOR A FISHING REEL

(75) Inventor: Eun-Ki Sim, Incheon-si (KR)

(73) Assignee: Cocus, Inc., Gyeonggi-do (KR)

( * ) Notice: Subject to any disclaimer, the term of this patent is extended or adjusted under 35 U.S.C. 154(b) by 85 days.

(21) Appl. No.: 13/820,862

(22) PCT Filed: Aug. 18, 2011

(86) PCT No.: PCT/KR2011/006069
§ 371 (c)(1),
(2), (4) Date: Mar. 5, 2013

(87) PCT Pub. No.: WO2012/036384
PCT Pub. Date: Mar. 22, 2012

(65) Prior Publication Data
US 2013/0161434 A1 Jun. 27, 2013

(30) Foreign Application Priority Data
Sep. 16, 2010 (KR) .................... 20-2010-0009722 U (51) Int. Cl.
*A01K 89/01* (2006.01)
*A01K 89/0155* (2006.01)
*A01K 89/02* (2006.01)

(52) U.S. Cl.
CPC ........... *A01K 89/02* (2013.01); *A01K 89/01555* (2013.01); *A01K 89/0155* (2013.01)
USPC ........... 242/303; 242/302; 242/288; 242/289; 242/304; 242/290

(58) Field of Classification Search
CPC .................... A01K 89/0155; A01K 89/01555; A01K 89/033
USPC .................. 242/286, 288, 289, 290, 302–304
See application file for complete search history.

(56) References Cited

U.S. PATENT DOCUMENTS

| 2,753,129 | A | * | 7/1956 | Martin .......................... 242/287 |
| 5,950,949 | A | * | 9/1999 | Cockerham ................... 242/289 |
| 5,984,221 | A | * | 11/1999 | Kim .............................. 242/289 |
| 6,003,798 | A | * | 12/1999 | Kim .............................. 242/289 |
| 6,371,396 | B1 | | 4/2002 | Kawasaki |
| 6,422,498 | B1 | * | 7/2002 | Littau et al. ................... 242/288 |
| 7,503,517 | B2 | | 3/2009 | Ikuta et al. |
| 2007/0108330 | A1 | | 5/2007 | Ikuta et al. |

FOREIGN PATENT DOCUMENTS

| JP | 11-96728 A | 7/1999 |
| JP | 2000-125727 A | 5/2000 |
| KR | 10-2002-0019401 A | 3/2002 |
| KR | 10-0646438 B1 | 11/2006 |

* cited by examiner

Primary Examiner — Emmanuel M Marcelo
(74) Attorney, Agent, or Firm — Rabin & Berdo, P.C.

(57) ABSTRACT

Disclosed is a fishing reel. A brake dial is provided in the side of an outer cover outside of a spool cover. An externally controllable brake device is provided between the brake dial and the spool cover such that the brake device is operated according to adjustment of the brake dial. A brush-type brake unit is fixed to the externally controllable brake device in the side of an inner surface of the spool cover so as to control the rotary force of the spool while laterally moving in response to actuation of the externally controllable brake device.

7 Claims, 10 Drawing Sheets

BRUSH BRAKE DEVICE FOR A FISHING REEL

BACKGROUND OF THE INVENTION

1. Field of the Invention

The present invention relates, in general, to a fishing reel having a brush-type brake device and, more particularly, to a fishing reel having a brush-type brake unit which is fixed to an externally controllable brake unit such that, when a brake dial is externally adjusted, the brush-type brake unit is tightened toward a spool so as to simply control a rotary force of the spool, thereby providing convenience of use and improving performance of a product.

2. Description of the Related Art

Generally, a spool brake system of a fishing reel is commonly adapted to a bait casting reel in order to solve the problem of a line backlash (also referred to as 'line nesting') that is a phenomenon in which fishing line becomes entangled due to excessive rotation of a spool.

Since the spool brake system uses a spool which is oriented towards a lateral direction and rotates while the fishing line is being cast, the bait casting reel is subjected to the backlash, compared to a spinning reel and a spin-casting reel.

Such a problem occurs mainly due to an amount of rotary motion that is performed by the spool.

A variety of brake systems have been proposed in order to solve the problem of a backlash, wherein the brake systems mainly comprise a magnet brake system or a centrifugal brake system.

As compared to the magnet brake system, the centrifugal brake system has an advantage in that as the revolution speed increases, a braking force of the centrifugal brake system increases.

Such a centrifugal brake system was disclosed in Korean unexamined patent publication No. 2002-19401, entitled "Brake system for bait casting reel having unlimited control function".

The above centrifugal brake system for a fishing reel includes a support structure for supporting a truncated conical braking surface, a rotatable spool for fishing line, a plurality of braking elements which rotates together with the spool and is actuated to contact the braking surface, at least one rotatable cam having at least one inclined portion with an outer end and a base end, at least one interacting member which protrudes from the support structure to interact with the cam, and at least one pressing member which continuously forces the interacting member to come into contact with the cam. In use, when the interacting member is brought into contact with the base end, the braking surface is located at a first position, when the interacting member is brought into contact with the outer end, the braking surface is located at a second position, and as the braking surface is moved between the first position and the second position, the braking elements is located such that it is continuously surrounded by the braking surface.

In the conventional fishing reel having the brake system, the plurality of brake elements is formed outside an assembly of the brake elements, so that the respective brake elements come into contact with the braking surface which is outwards from the inside of a brake ring, thereby braking the rotary force of the spool.

However, the conventional fishing reel having the brake system had a problem in that since the brake elements are brought into contact with only the outer surface of the brake ring, upon casting the fishing line, as a sinker or a fish-hook passes through the peak of a casting path, the speed at which the sinker advances while drawing the fish-hook gradually decreases, so that the centrifugal force of the assembly of the brake elements considerably reduces so as not to restrict the revolution of the spool, thereby causing the fishing line to become entangled because the revolution speed of the spool exceeds the unwinding speed of the fishing line.

Here, while a user should control the revolution of the spool with his/her thumb in order to prevent the entanglement of the fishing line, this is a very skillful operation to a beginner.

Further, the conventional magnetic or centrifugal brake for a fishing reel also has a problem in that it is activated at an initial stage of the casting, i.e. when the spool is rotated at high speed, whereas, when the spool is rotated at low speed, due to a backlash, a thumbing action is needed.

SUMMARY OF THE INVENTION

Accordingly, the present invention has been made keeping in mind the above problems occurring in the related art, and the present invention is intended to propose a fishing reel having a brush-type brake unit which is simply provided at an inner surface of a spool cover such that rotary force of a spool is controlled according to actuation of an externally controllable brake system, simplifying the structure thereof, thereby increasing the operational efficiency and casting distance while maximizing the braking force.

Further, the present invention is intended to propose a fishing reel having a brush-type brake unit capable of simply controlling a rotary force of a spool by adjusting a brake dial at the outside of the fishing reel, thereby improving the convenience of use.

Further, the present invention is intended to propose a fishing reel having a brush-type brake unit capable of easily controlling the braking force acting on a spool according to an adjustment interval of a brake dial, thereby improving the performance and efficiency of a product.

Further, the present invention is intended to propose a fishing reel having a brush-type brake unit capable of easily controlling the braking force acting on a spool according to simple sliding action by an inclined angle of the inside of a spool cover, thereby simplifying the structure and maximizing the braking efficiency.

Furthermore, the present invention is intended to propose a fishing reel having a brush-type brake unit capable of activating the braking force both at an initial stage of casting, i.e. when a spool is rotated at high speed, and when the spool is rotated at low speed, thereby replacing an existing brake system and at the same time, preventing a backlash without any thumbing action.

In order to achieve the above objects, the present invention provides a fishing reel including a brake dial provided in the side of an outer cover outside of a spool cover, an externally controllable brake device provided between the brake dial and the spool cover such that the brake device is operated according to adjustment of the brake dial, and a brush-type brake unit fixed to the externally controllable brake device in the side of an inner surface of the spool cover so as to control the rotary force of the spool while laterally moving in response to actuation of the externally controllable brake device.

As set forth before, according to the present invention, the externally controllable brake device is provided between the spool cover and the outer cover such that it laterally slides as the brake dial rotates, and the brush-type brake unit is fixed to the externally controllable brake device in the side of an inner surface of the spool cover so as to control the rotary force of the spool while laterally moving in response to actuation of the externally controllable brake device, so that a user can control a rotary force of the spool by the simple adjustment at the outside of the fishing reel, braking efficiency can be maximized with a simple structure, and since entanglement of fishing line can be prevented, a beginner as well as a fishing professional can easily use the fishing reel, thereby maximizing the convenience of use as well as efficiency of a product while providing reliability to the user.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
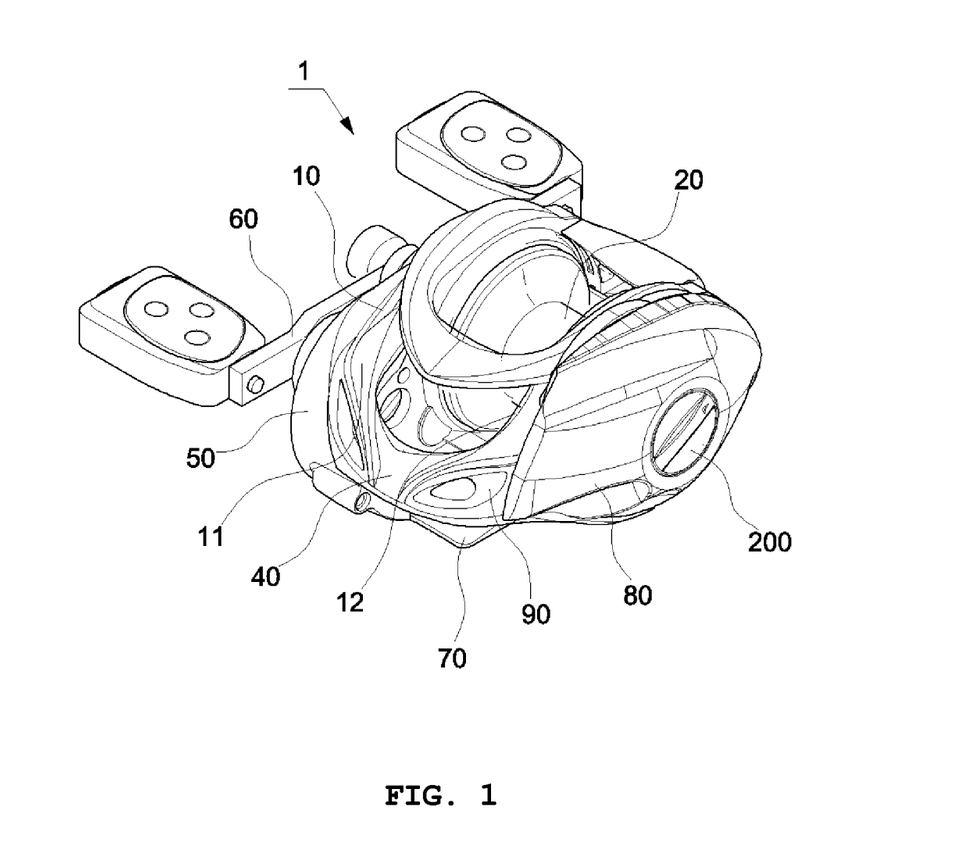
FIG. 1 is a perspective view showing a fishing reel according to the present invention.
Figure 2:
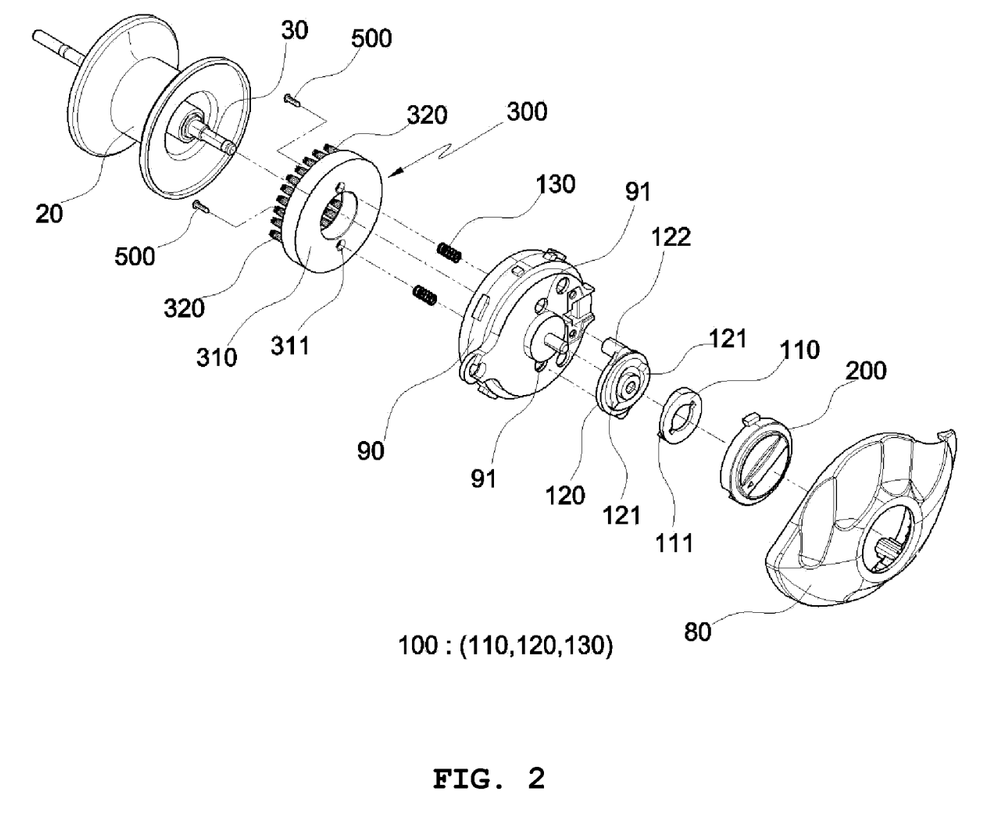
FIG. 2 is an exploded perspective view showing the fishing reel.
Figure 3:
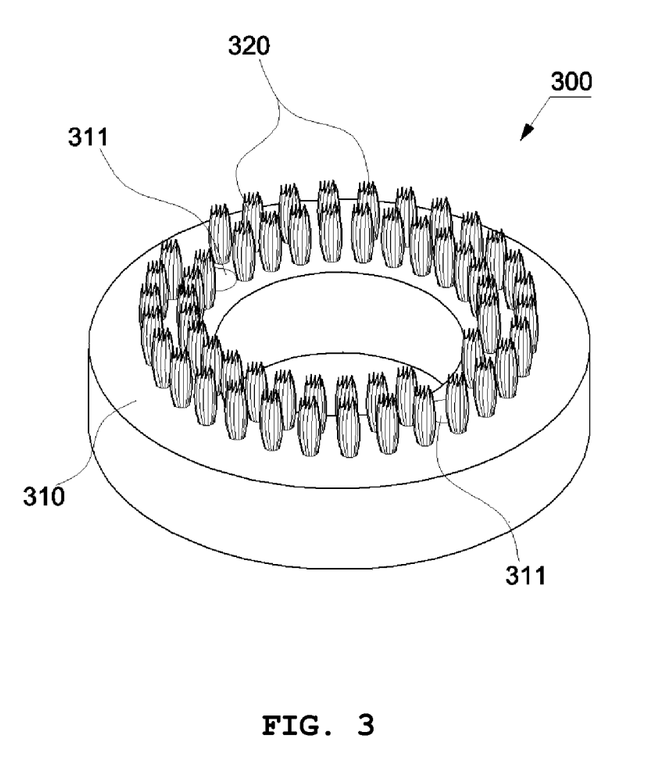
FIG. 3 is a perspective view showing a brush-type brake unit according to the present invention.
Figure 4:
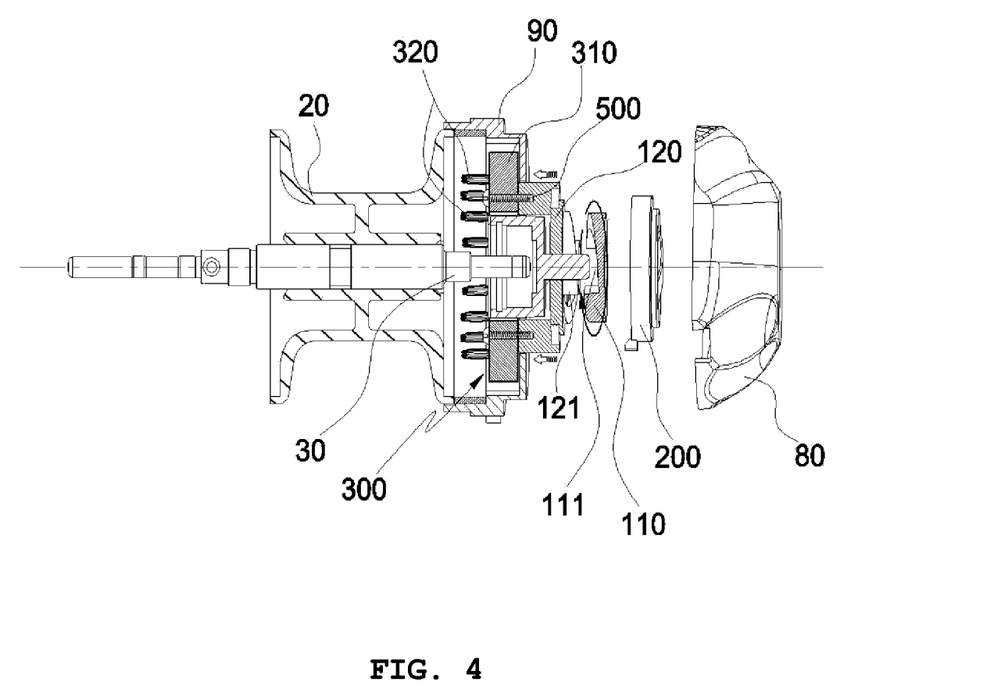
FIG. 4 is a cross-sectional view showing major parts of the fishing reel at the time when a spool rotates.
Figure 5:
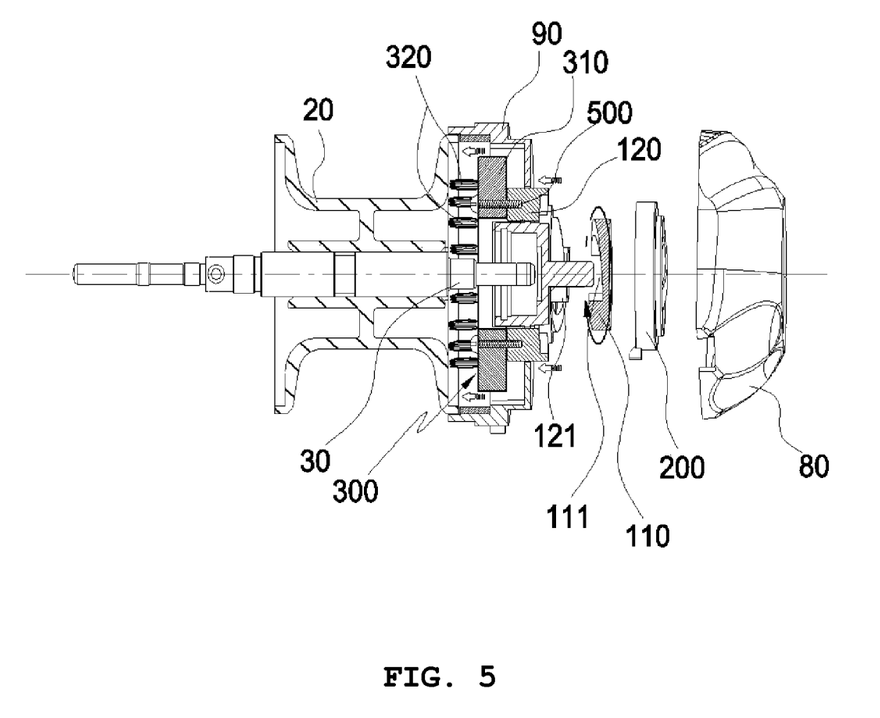
FIG. 5 is a cross-sectional view showing an operational state of the brake unit when the spool stops rotating.
Figure 6:
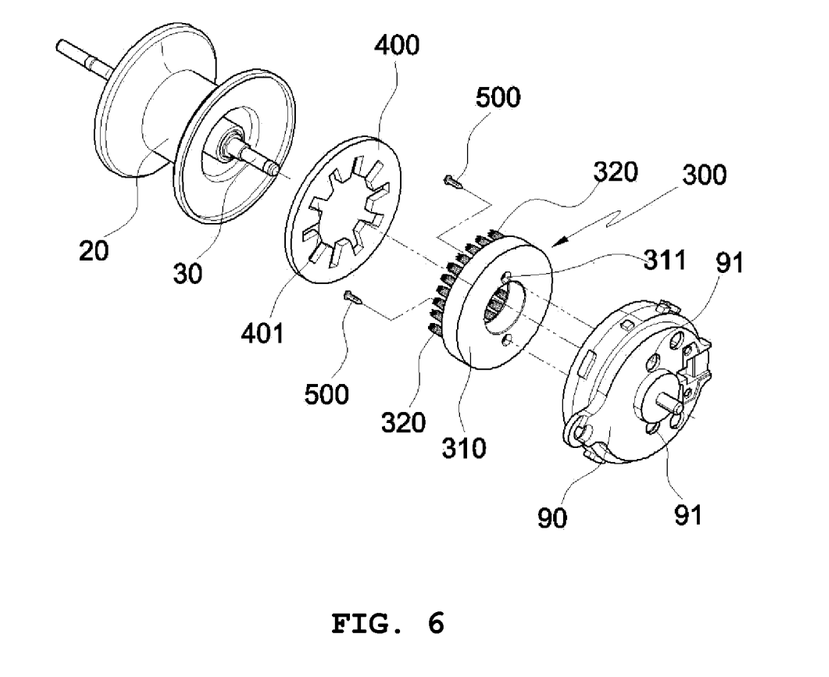
FIG. 6 is an exploded perspective view showing another example of a fishing reel according to the present invention.
Figure 7A:
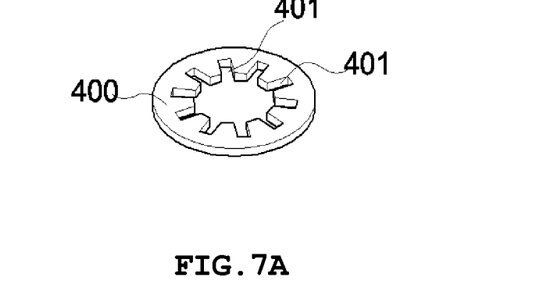
FIGS. 7A to 7C are perspective views showing another example of a friction plate of the fishing reel.
Figure 7B:
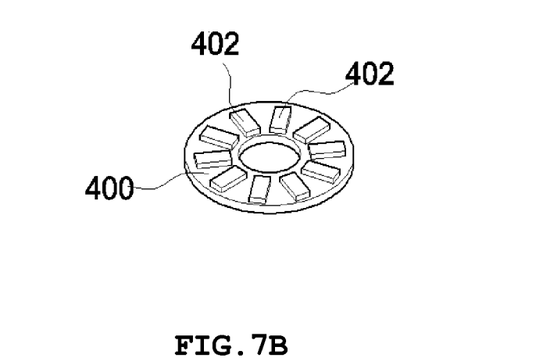
Figure 7C:
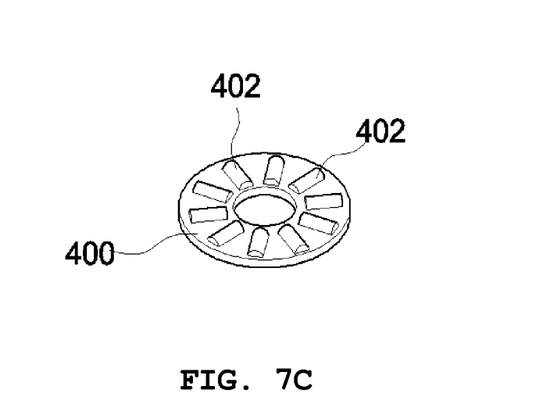
Figure 8:
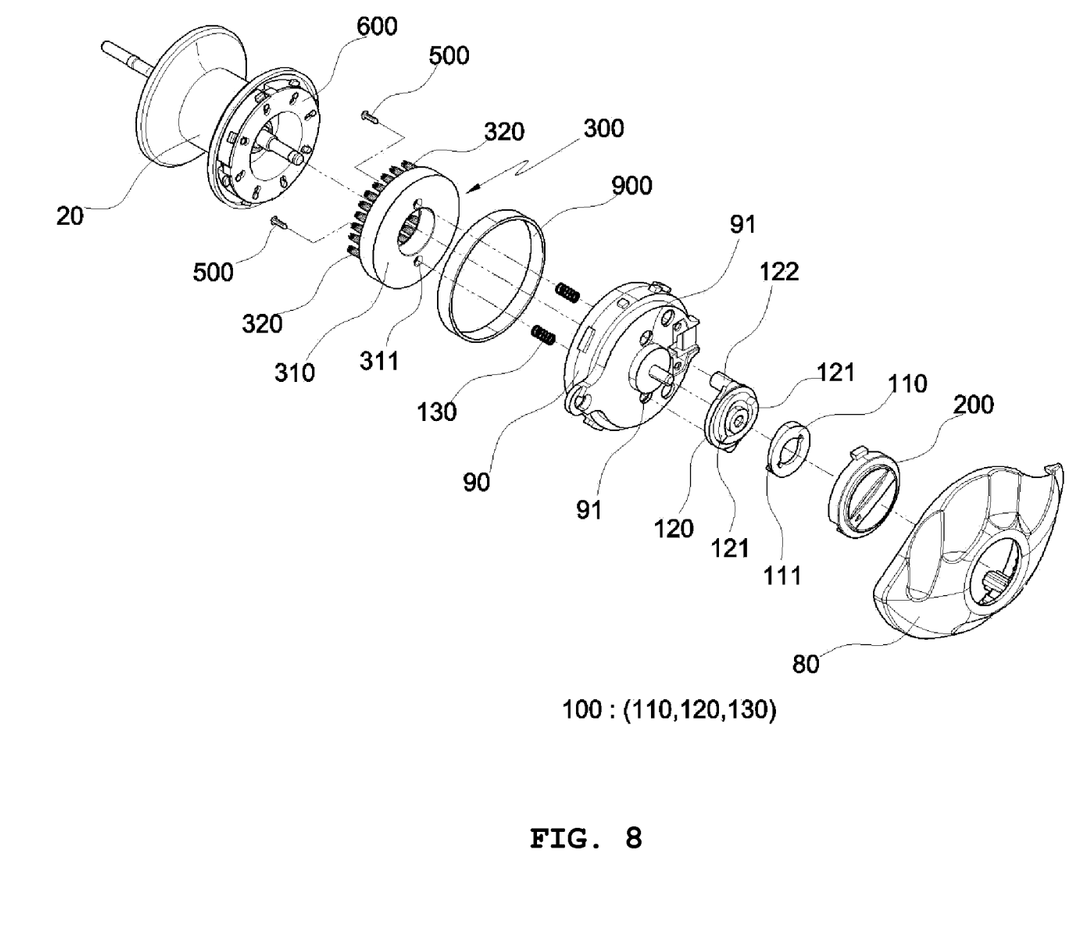
FIGS. 8 to 10 are exploded perspective view showing another example of a fishing reel according to the present invention.
Figure 9:
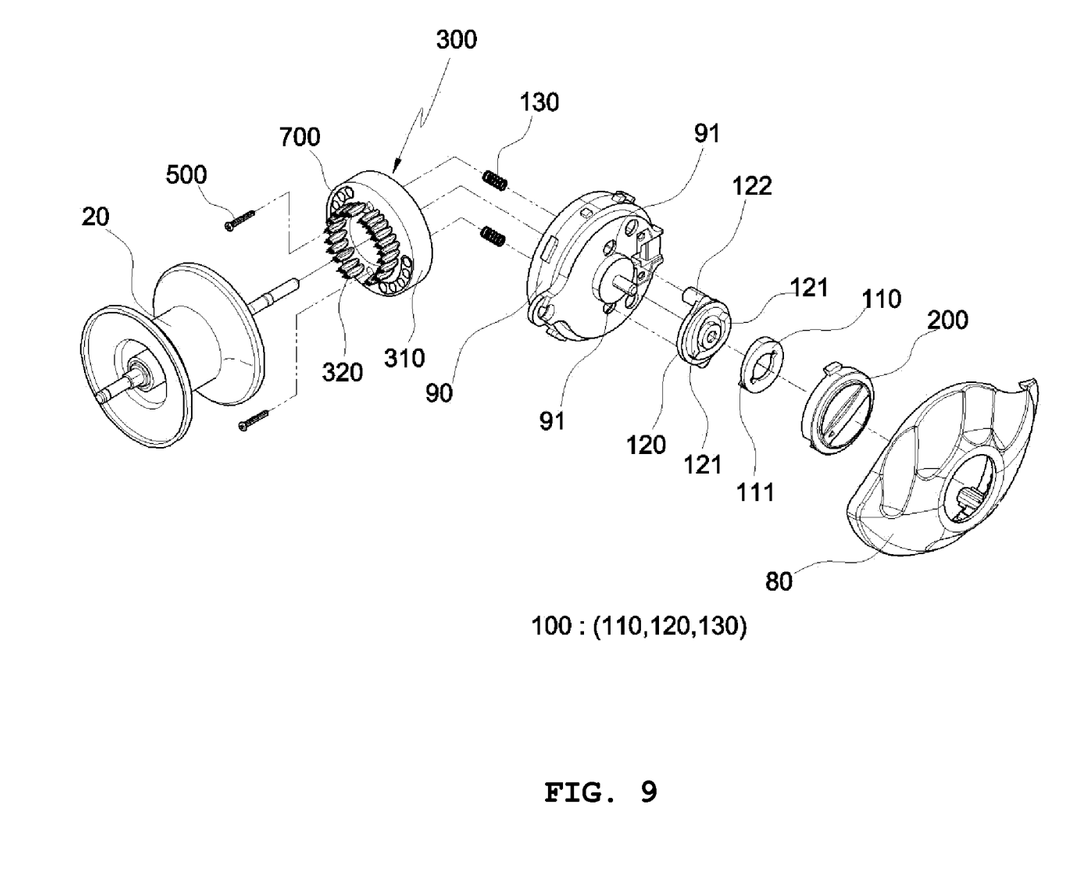
Figure 10:
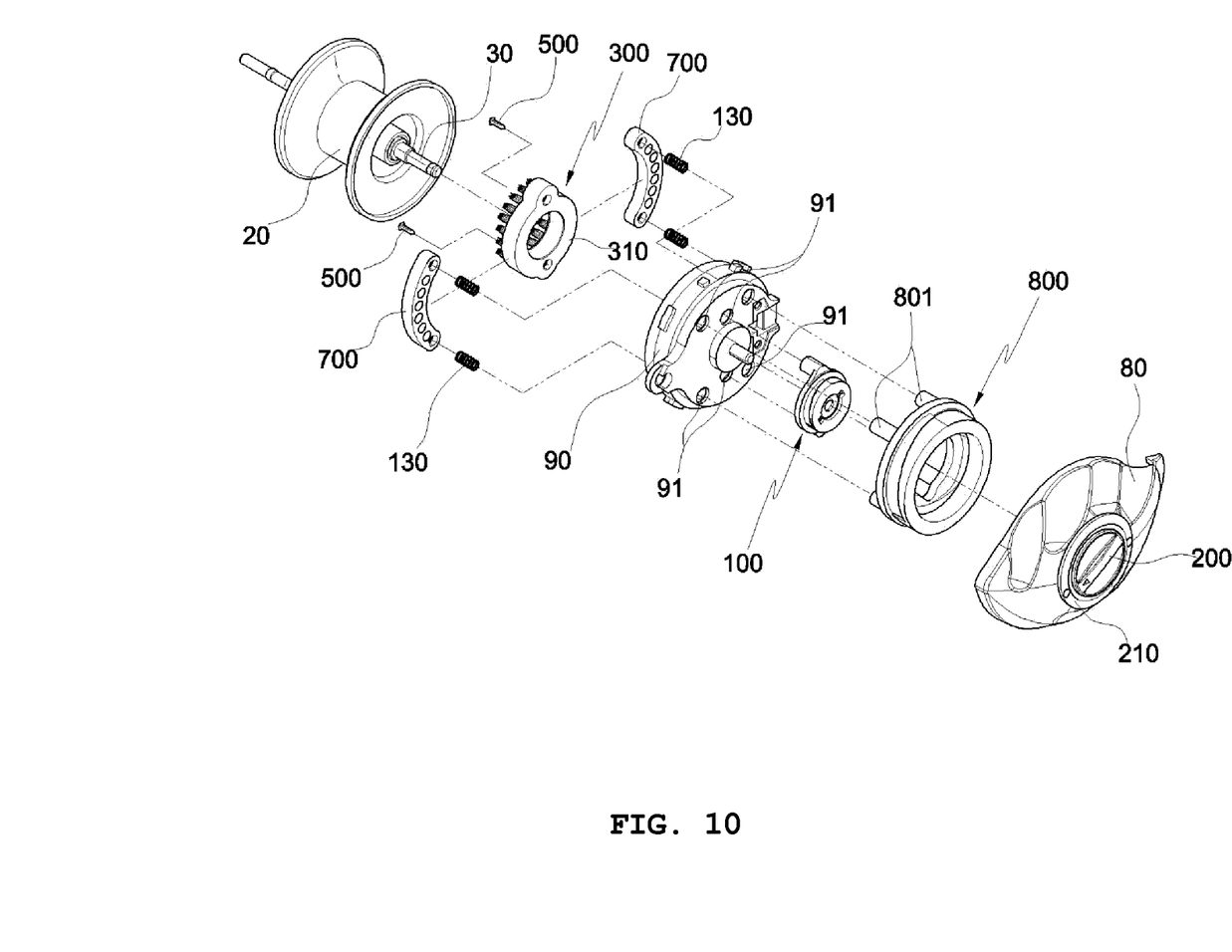

FIG. 1 is a perspective view showing a fishing reel according to the present invention, FIG. 2 is an exploded perspective view showing the fishing reel, FIG. 3 is a perspective view showing a brush-type brake unit according to the present invention, FIG. 4 is a cross-sectional view showing major parts of the fishing reel at the time when a spool rotates, FIG. 5 is a cross-sectional view showing an operational state of the brake unit when the spool stops rotating, FIG. 6 is an exploded perspective view showing another example of a fishing reel according to the present invention, FIGS. 7A to 7C are perspective views showing another example of a friction plate of the fishing reel, and FIGS. 8 to 10 are exploded perspective view showing another example of a fishing reel according to the present invention.

As shown in FIGS. 1 to 5, the fishing reel of the present invention includes a frame 10 having a right plate 11 and a left plate 12, a spool 20 rotatably mounted between the left plate 12 and the right plate 11 of the frame 10 and around which fishing line is wound, a main shaft 30 passing through the spool 20, a level winding mechanism 40 which moves across the spool 20 during winding of fishing line in order to uniformly wind the fishing line over the whole width of the spool 20, a right outer cover 50 fixed to the outside of the right plate 11, a handle 60 which operatively extends from the right outer cover 50 in order to rotate the spool 20, a reel foot 70 which is formed on the bottom of the frame 10 so as to attach the reel 1 to a fishing rod, and a left outer cover 80 fixed onto the left plate 12.

A brake dial 200 is provided in the center of the left outer cover 80, and an externally controllable brake device 100 is provided between the brake dial 200 and the spool cover 90 such that it is operated as the brake dial 200 rotates.

A brush-type brake unit 300 is provided in the side of an inner surface of the spool cover 90 such that it is connected with the externally controllable device 100 so as to control the rotary force of the spool 20 while being guided laterally according to actuation of the externally controllable brake device 100.

The externally controllable brake device 100 includes a rotary section 110 which rotates as the brake dial 200 rotates, and a brake housing which is brought into close contact with the rotary section 110 so as to laterally slide in response to the rotation of the rotary section 110, thereby guiding the brush-type brake unit 300.

The rotary section 110 is provided in one side with opposite slide parts 111 that have inclined surfaces, respectively, that are inclined at a certain angle in opposite direction.

The brake housing 120 has, in one side, opposite inclined protrusions 121 that have inclined surfaces, respectively, that are inclined at a certain angle in opposite direction, and in the other side, guide protrusions 122 which are coupled with the brush-type brake unit 300 through through-holes 91 of the spool cover 90.

A coil spring 130 is provided between the brake housing 120 and the spool cover 90 so as to elastically support the brake housing 120.

The slide parts 111 of the rotary section 110 and the inclined protrusions 121 of the brake housing 120 may preferably be formed such that the respective inclined surfaces are alternately provided so that the brake housing 120 is guided in the left and right sides when the rotary section 110 rotates.

The brush-type brake unit 300 includes a base plate 310 having a plurality of bristles 320 attached thereto, wherein the base plate is provided in proximity of an inner surface of the spool cover 90 such that it is fixed to the externally controllable brake device 100 such that it is laterally guided when the externally controllable brake device 100 is actuated, thereby controlling the rotary force of the spool 20.

The base plate 310 is provided with coupling holes 311 through which the guide protrusions 122 of the brake housing 120, which are inserted through the through-holes 91, are coupled to the base plate by means of a screw 500, so that the brush-type brake unit 300 is fixed to the externally controllable brake device 100.

The bristles 320 may preferably be arranged in one or more rows, such as in two or three rows, so as to suit the brake force of the spool 20 according to kinds of reels 1 or fishing applications.

As shown in FIG. 6, the reel 1 includes, on a lateral side of the spool 20, a friction plate 400 with which the bristles 320 of the brush-type brake unit 300 is brought into close contact, increasing the friction force applied to the spool 20.

Further, as shown in FIGS. 7A to 7C, the friction plate 400 is provided at one side with friction holes 401 or friction protrusions 402 in order to maximize the friction force applied to the spool 20 when the bristles 320 is brought into close contact with the friction plate 400. Here, the friction protrusion has a shape like a rectangle, a semi-circle, a waveform, etc.

According to another embodiment of the present invention, as shown in FIG. 8, a reel 1 includes a centrifugal brake device 600 between the spool cover 90 and the spool 20 so as to control rotation of the spool 20, and an outer ring 900 which is provided to allow the centrifugal brake device 600 to be smoothly actuated on the lateral side of the spool 20.

According to a further embodiment of the present invention, as shown in FIG. 9, a reel 1 includes a magnetic brake device 700 which is integrally provided in the brush-type brake unit 300.

As shown in FIG. 10, a reel 1 includes a magnetic brake device 700 which is provided in the lateral side of the brush-type brake unit 300, a guide unit 800 which is provided outside of the externally controllable brake device 100 such that it is connected with the magnetic brake device 700 so as to guide the magnetic brake device 700, and an auxiliary brake dial 210 which is provided to the left outer cover 80 so as to guide the guide unit 800 to actuate the magnetic brake device 700.

Further, the guide unit 800 is provided on one side with coupling protrusions 801, which pass through the through-hole 91 of the spool cover 90 and are fastened by screws 500 while elastically supporting the magnetic brake device 700 using the coil spring 130.

The operation of the fishing reel having the above-mentioned construction will now be described.

First, after the fishing reel 1 has been mounted to a fishing rod (not shown), when the fishing line is cast, the spool 20 rotates in the cast direction while the fishing line is being unwounded from the spool 20.

Then, after the fishing line has been unwounded by the rotation of the spool 20, when the rotary motion of the spool 20 is intended to stop, a user externally turns the brake dial 200, so that the externally controllable brake device 100, which is coupled to the brake dial 200, also rotates and is guided towards the spool cover 90.

In this way, as the brake dial 200 rotates, the rotary section 110 also rotates so that at the same time, the opposite slide parts 111 of the rotary section 110, which have the opposite inclined surfaces extending towards opposite direction, rotate along the inclined protrusions 121 of the brake housing 120, which have the inclined surfaces that alternately extend.

Since the inclined surfaces of the slide parts 111 and inclined protrusions 121 are alternately formed such that the inclined heights oppositely alternate, the slide parts 111 slide towards higher side of the inclined surfaces of the inclined protrusions 121, so that the brake housing engaged with the rotary section 110 is guided towards one side while being separated away from the rotary section 110.

Thus, the brush-type brake unit 300, which has been couple to the guide protrusion 122 of the brake housing 120 by screws 500, is guided in the same direction as the brake housing 120, i.e. towards the spool 20, so that the bristles 320 come into close contact with the spool 20, restricting the rotary force of the spool 20.

Meanwhile, in the state when the bristles 320 are rubbing the spool 20 while being brought into close contact therewith, if the rotary speed of the spool is high, due to high rotary speed of the spool, the bristles 320 are put down towards the rotary direction rather than the linear direction facing the lateral side of the spool 20, so that the cast distance of the fishing line is increased. Further, if the rotary speed of the spool 20 is gradually reduced, the bristles 320, which have been put down towards the rotary direction of the spool 20, gradually return to linear direction facing the lateral side of the spool 20, so that the brake force applied to the spool 20 can be maximized.

Further, with the provision of the friction plate 400 provided in the spool 20, when the brush-type brake unit 300 is actuated in order to control the rotary force of the spool 20, the bristles 320 are brought into close contact with the friction plate 400, thereby increasing the friction force and therefore maximizing the brake action applied to the spool 20.

On the contrary, in case that a user wants to rotate the spool 20, when the brake dial 200 is turned in the opposite direction, the rotary section 110 reversely rotates, the slide parts 111 of the rotary section 110, which was separated away from the brake housing 120, rotate towards the lower side of the inclined surfaces of the inclined protrusions 121, and at the same time, the brake housing 120 is guided towards the left outer cover 80 by the elastic force of the coil spring 130.

Thus, the brush-type brake unit 300, which was coupled with the brake housing 120, is guided towards the spool cover 90 and is separated away from the spool 20, so that the spool 20 can maintain its rotation state.

Thus, according to the reel 1 of the present invention, when a user externally turns the brake dial 200 so that the externally controllable brake device 100 is rotated and slid, the brush-type brake unit 300, which is connected with the externally controllable brake device 100, is guided such that the bristles 320 are brought into close contact with the spool 20 or the friction plate 400 so as to restricting the rotary force of the spool 20, providing the effects such as easy use, a simple structure, increased cast distance of the fishing line, and maximized brake efficiency.

Furthermore, the reel 1 of the present invention employs the centrifugal brake device 600 and the magnetic brake device 700 together, as well as the brush-type brake unit 300, further improving the brake efficiency for the spool.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A fishing reel comprising:
a frame having a right plate and a left plate;
a spool rotatably mounted between the left plate and the right plate of the frame and around which fishing line is wound;
a spool cover;
a main shaft passing through the spool;
a level winding mechanism which moves across the spool during winding of fishing line in order to uniformly wind the fishing line over the whole width of the spool;
a right outer cover fixed to the outside of the right plate;
a handle operatively extending from the right outer cover in order to rotate the spool;
a reel foot formed on a bottom of the frame so as to attach the reel to a fishing rod;
a left outer cover fixed onto the left plate;
a brake dial provided in the center of the left outer cover;
an externally controllable brake device provided between the brake dial and the spool cover such that it is operated as the brake dial rotates;
a brush-type brake unit provided in a side of an inner surface of the spool cover such that it is connected with the externally controllable device so as to control the rotary force of the spool while being guided laterally according to actuation of the externally controllable brake device; and
a friction plate on a lateral side of the spool, with which the brush-type brake unit to be guided by the actuation of the externally controllable brake device is brought into close contact, increasing the friction force applied to the spool, the friction plate having friction holes at one side thereof in order to maximize the friction force applied to the spool when the brush-type brake unit is brought into close contact with the friction plate.

2. The fishing reel according to claim 1, wherein the brush-type brake unit includes a base plate having a plurality of bristles attached thereto, wherein the base plate is provided in proximity of an inner surface of the spool cover such that it is fixed to the externally controllable brake device such that it is laterally guided when the externally controllable brake device is actuated, thereby controlling the rotary force of the spool.

3. The fishing reel according to claim 2, wherein the bristles are arranged in one or more rows so as to alter the brake force of the spool according to kind of reels or fishing applications.

4. The fishing reel according to claim 1, wherein a centrifugal brake device is provided between the spool cover and the spool so as to control rotation of the spool.

5. The fishing reel according to claim 1, wherein a magnetic brake device is integrally provided in the brush-type brake unit.

6. The fishing reel according to claim 1, the reel includes a magnetic brake device which is provided in a lateral side of the brush-type brake unit, a guide unit which is provided outside of the externally controllable brake device such that it is connected with the magnetic brake device so as to guide the magnetic brake device, and an auxiliary brake dial which is provided to the left outer cover so as to guide the guide unit to actuate the magnetic brake device.

7. The fishing reel according to claim 6, wherein the guide unit is provided on its one side with coupling protrusions, which pass through a through-hole of the spool cover and are fastened by screws while elastically supporting the magnetic brake device using a coil spring.

* * * * *